UNITED STATES PATENT OFFICE.

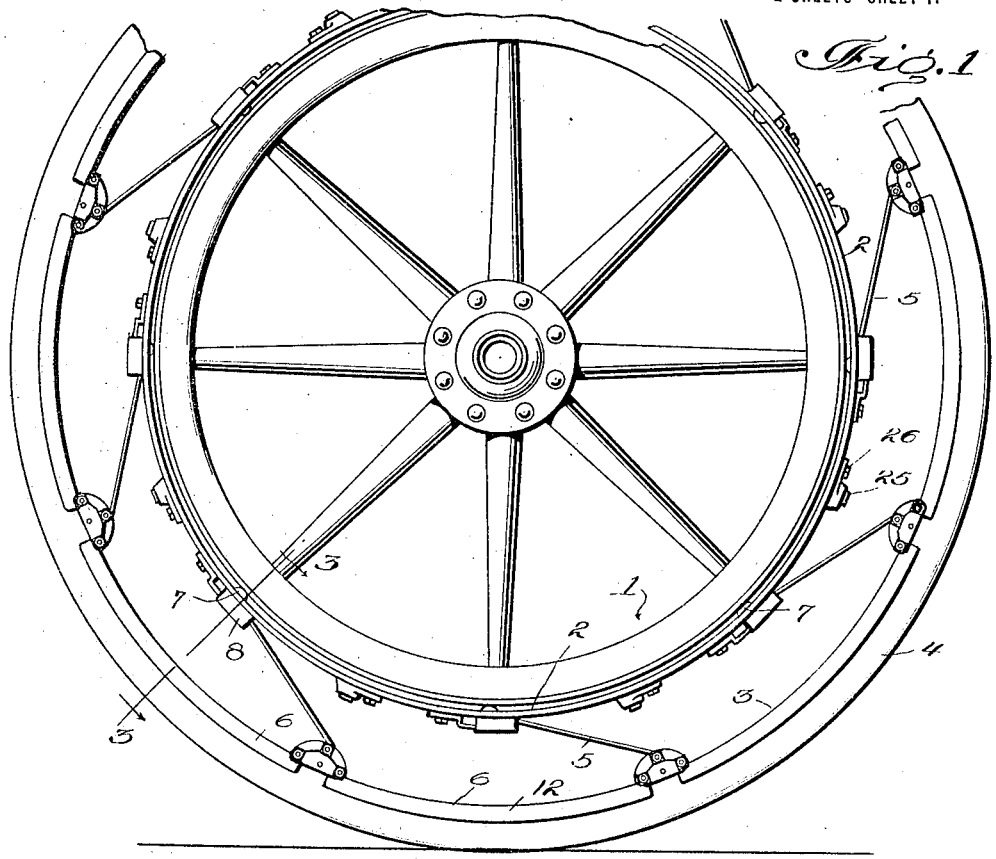

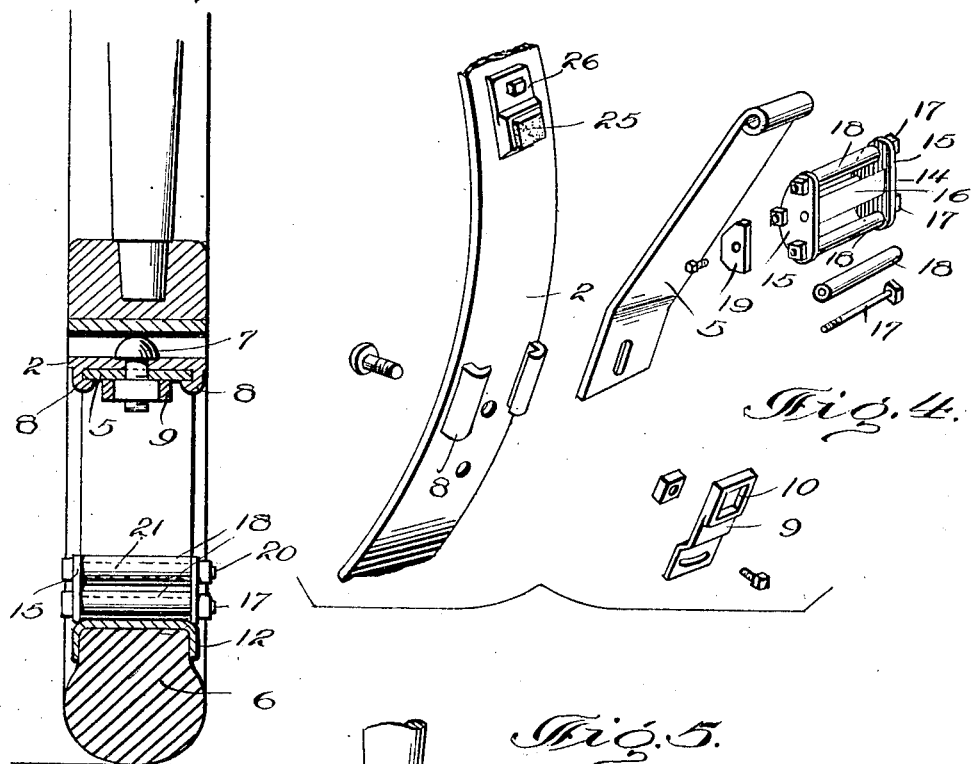
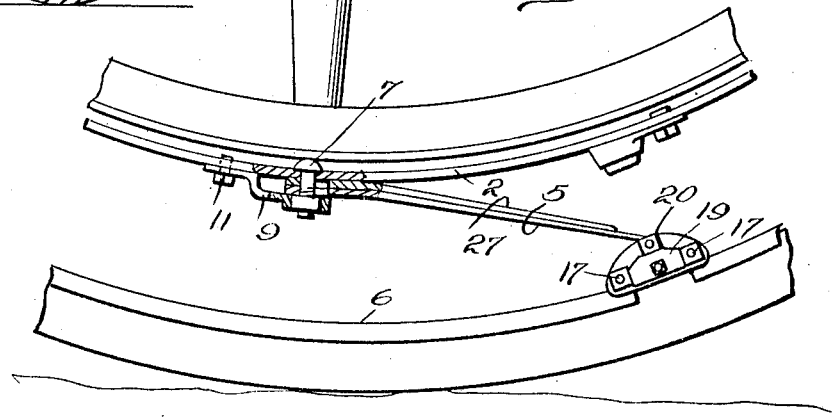

EDWARD E. DRACH, OF DENVER, COLORADO.

VEHICLE-WHEEL.

1,292,729.    Specification of Letters Patent.    Patented Jan. 28, 1919.

Application filed July 14, 1917. Serial No. 180,608.

*To all whom it may concern:*

Be it known that I, EDWARD E. DRACH, of Denver, in the county of Denver and State of Colorado, have invented certain new and useful Improvements in Vehicle-Wheels; and I do hereby declare the following to be a full, clear, and exact description of the invention, such as will enable others skilled in the art to which it appertains to make and use the same.

My invention relates to vehicle wheels and more particularly to wheels of the type having shock absorbing means in the form of springs located at the periphery of the wheel between spaced inner and outer rims, and the primary object of the invention is to provide an improved and simple spring connection between such rims as well as an improved construction of the outer rim whereby a maximum of resiliency may be obtained under load pressure.

A further object of the invention is the construction and assembling of the parts in such manner as to permit of application to wheels of known construction, such as those having demountable rims without the necessity of reconstructing the wheel, in addition to specially constructed wheels.

In the accompanying drawings, Figure 1 is an elevation of a wheel equipped with my improvements. Fig. 2 is an enlarged view of a portion of a wheel with parts in section. Fig. 3 is a cross sectional view on line 3—3, Fig. 1. Fig. 4 is a detail showing the spring and its fastening elements detached. Fig. 5 shows a slight modification.

In its entirety my improved wheel comprises a body portion 1, of usual wheel form, an inner rim 2, which may be made to rigidly attach to the felly of the wheel, by means of bolts, rivets or by a shrinking on process an outer rim 3, to which is secured a tire 4, and a plurality of carrying springs 5 located between and attached to the inner and outer rims 2 and 3. The outer rim is shown as formed of a series of connected segments 6, while the inner rim is preferably formed of one piece or hoop of metal. The latter may, as before stated, be rigidly attached to the felly of the wheel, or it may be adapted to be instantly adjusted for use on any wheel built for demountable rims. The leaf springs 5 are of appropriate and uniform resisting or carrying strength to sustain the weight of the load, and suspend it above and away from contact with the outer rim under gravity pressure or pressure upon the road bed in every position of the wheel in its course of rotation, and to prevent intermittent clashing of the parts or a jolting under load pressure. One end of each spring is fixedly and slidably secured to the inner rim preferably by a nutted bolt 7 which extends through an elongated slot 7' of the spring, sidewise movement of the latter being positively prevented by a pair of shouldered blocks 8 formed integral with the rim, the overhanging edges of the blocks fitting over the sides of the spring. To prevent the nut of the bolt 7 working loose I provide a locking plate 9 which fits over the end of the spring 5 and has a recessed portion 10 to take in the nut, the plate being fastened to the rim as at 11. Each spring, secured to the inner rim as stated, is tangential to such rim, thus projecting at an angle to the load pressure.

The segments 6 each have side flanges 12 forming a retaining means for the rubber or other tire. The segments are hingedly connected, each end of each segment being turned inwardly as at 13 to form pivot bearings. As a preferred joint between the segments I have shown a yoke 14 comprising two end plates 15 connected by a rib 16, and forming a bearing for nutted bolts 17 on which are friction sleeves 18. The bolts and their sleeves are passed through the inturned ends 13 of the segments, thus forming a hinged connection between these members, the nuts on the ends of the bolts being prevented from turning by a plate 19 secured to the appropriate end plate 15. In addition to the bolts 17 I also provide a bolt 20 likewise supported by the end plates, which bolt and its sleeve 21 are adapted to form a pivot for the outer end of the spring 5. The bearings at each end of the segments are slightly oval in cross section to permit play between the yokes and the segments so as to prevent a binding or crowding of the parts under load pressure.

25 designates what I term a bumper to provide against extreme direct load thrust due to an uneven road bed or other causes. A plurality of bumpers is employed and each is of solid rubber or other resilient medium and is preferably mounted upon a metal base 26 securely bolted to the outer surface of the inner rim at a point to support that end of the spring which is joined to the hinge connection between the outer rim segments and upon which extreme load pressure is directly exerted, as indicated in Fig. 1. Where the wheel is to be used in connection with vehicles adapted for unusual loads the carrying springs may be strengthened by additional leaves, such leaves being indicated at 27, and shown as secured in position by the same means by which the springs 5 are fastened to the rim. This is indicated in Fig. 5.

The advantages of my invention are apparent. By providing an outer rim composed of hinged sections and spacing such rim from an inner rim by means of leaf springs I am enabled to secure maximum resiliency at the point of greatest load stress without communicating such stress to the entire outer rim.

I claim as my invention:

1. In combination with a vehicle wheel, a cushioning means including an inner rim adapted to be secured to the periphery of the wheel and having pairs of spaced apart shouldered blocks formed integrally therewith, an outer rim spaced from said inner rim and comprising a series of segments, springs interposed between said rims, one end of each spring being slidably secured to the inner rim between a pair of said shouldered blocks, and yokes connecting said segments of the outer rim having each a pair of end plates, bearings supported by said plates forming pivots for the ends of adjacent segments, and an additional bearing to which the outer end of a spring is pivoted.

2. A vehicle wheel including a body portion, an inner rim secured thereto, an outer rim spaced from said inner rim and consisting of a plurality of segments, yokes composed of end plates and means for rigidly maintaining them in spaced relation, said yokes being located between the adjacent ends of the segments, means for pivotally and loosely connecting the segments to the yokes, and springs slidably connected to the inner rim and pivotally connected to the yokes.

3. In combination with a vehicle wheel, a cushioning means including an inner rim adapted to be secured to the periphery of the wheel and having pairs of spaced apart shouldered blocks formed integrally therewith, an outer rim spaced from said inner rim and comprising a series of segments, springs interposed between said rims, one end of each spring being slidably secured to the inner rim between a pair of said shouldered blocks, and yokes connecting said segments of the outer rim having each a pair of end plates, bolts connecting said plates, sleeves on said bolts, two of the latter and their complementary sleeves forming a hinged connection between the ends of adjacent segments, and a third bolt and its sleeve forming a bearing for the other end of a spring.

In testimony whereof, I have signed this specification in the presence of two subscribing witnesses.

EDWARD E. DRACH.

Witnesses:
E. J. SCHNEIDER,
B. C. DRACH.

Copies of this patent may be obtained for five cents each, by addressing the "Commissioner of Patents, Washington, D. C."